April 24, 1934.  E. S. MacPHERSON  1,955,968
FRONT END CONSTRUCTION FOR VEHICLES
Filed Oct. 10, 1932  2 Sheets-Sheet 1
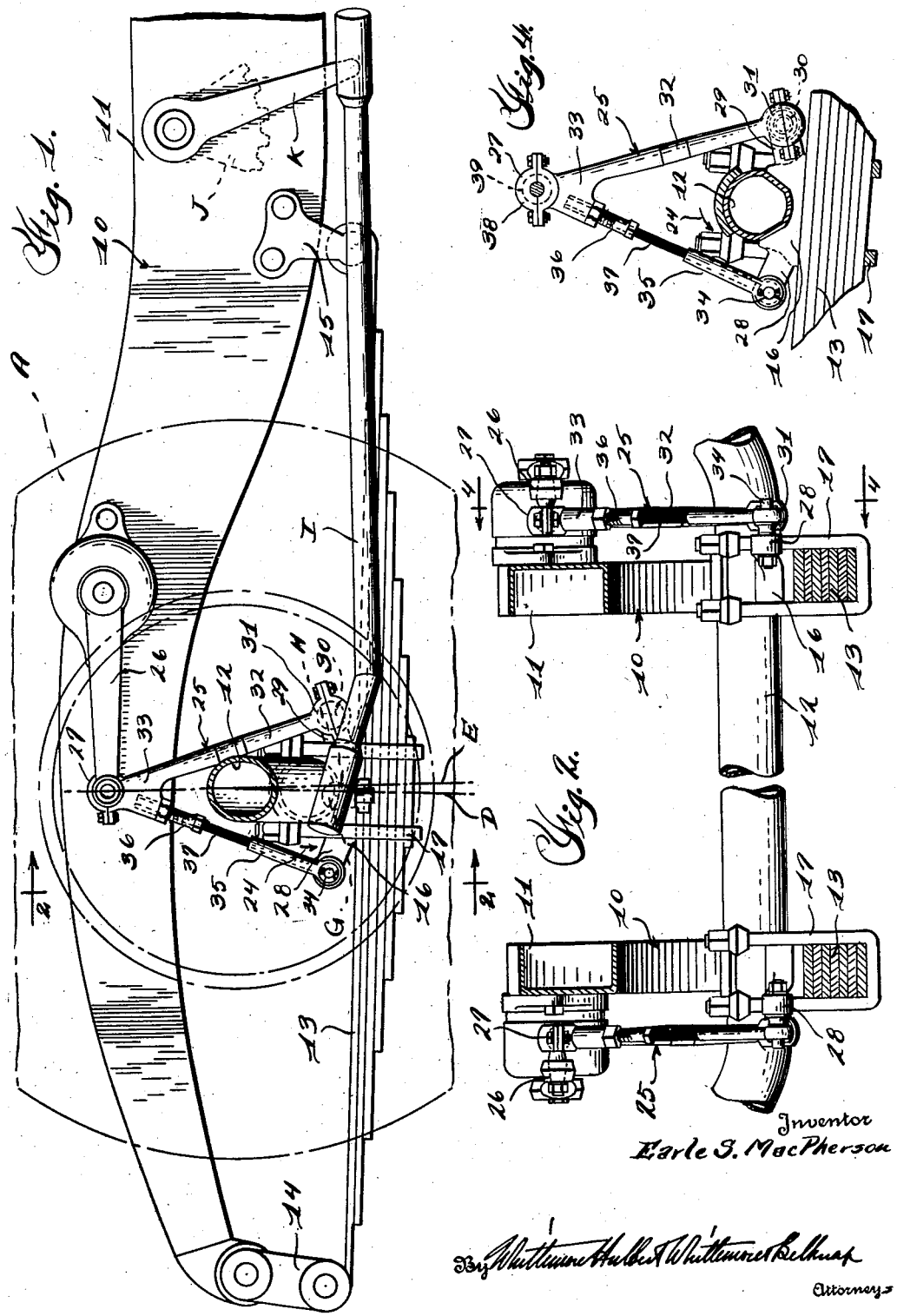

April 24, 1934.  E. S. MacPHERSON  1,955,968
FRONT END CONSTRUCTION FOR VEHICLES
Filed Oct. 10, 1932  2 Sheets-Sheet 2
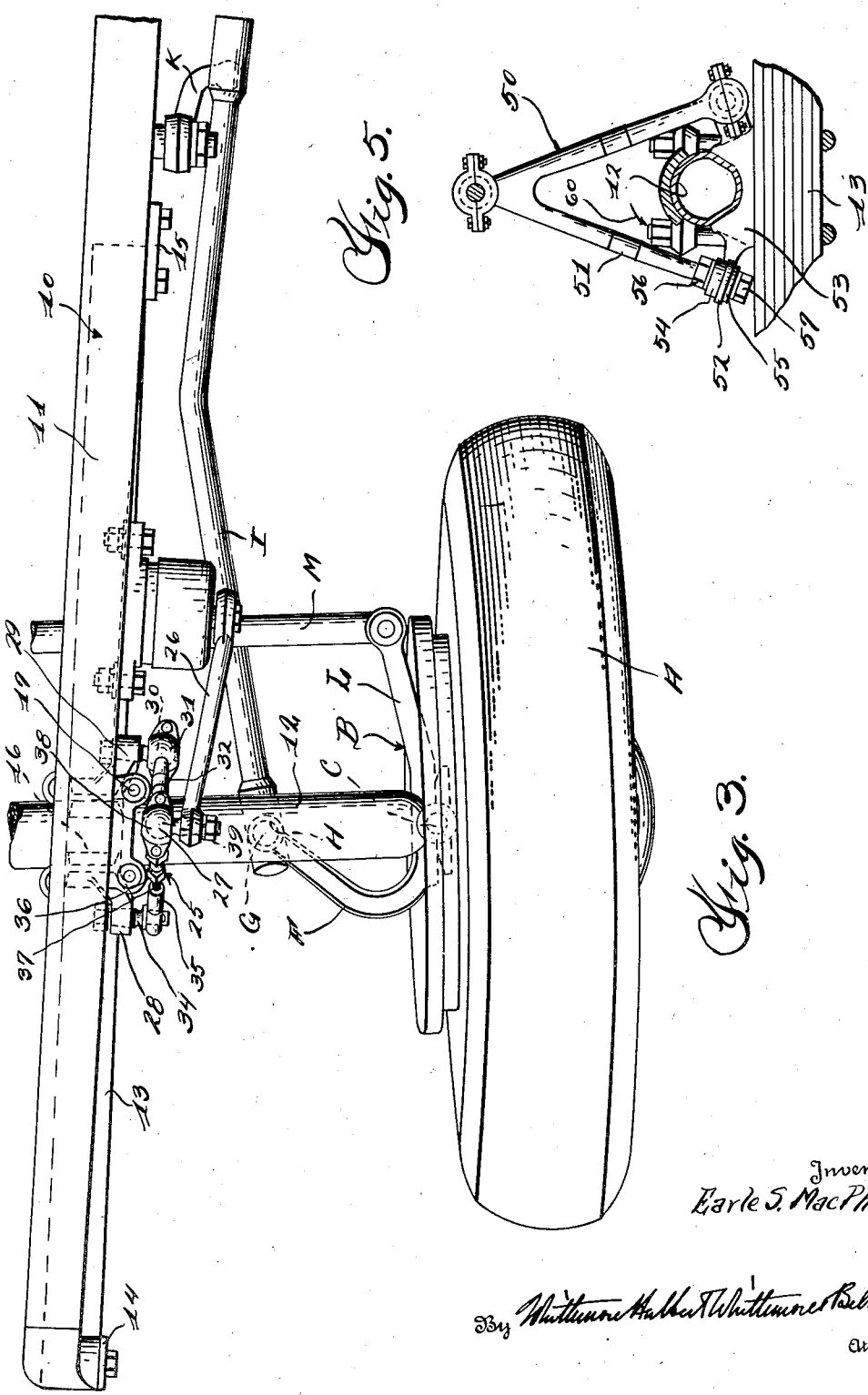
Inventor
Earle S. MacPherson Patented Apr. 24, 1934

1,955,968

UNITED STATES PATENT OFFICE 1,955,968

FRONT END CONSTRUCTION FOR VEHICLES

Earle S. MacPherson, Detroit, Mich., assignor to Hupp Motor Car Corporation, Detroit, Mich., a corporation of Virginia Application October 10, 1932, Serial No. 637,149

12 Claims. (Cl. 280—124)

This invention relates generally to motor vehicles and refers more particularly to improvements in the front end constructions thereof.

The geometrical relationship of the steering axle, wheel alignment, and steering mechanism has always been generally understood to be highly critical and of the utmost importance in the realization of efficient control of a vehicle. Probably the most important single factor of steering wheel control is the caster angle or steering knuckle-pivot rake, and exhaustive experimental work has proven that this angle must be maintained to at least a predetermined positive quantity in order to obtain the desired stability of the front end construction. Heretofore considerable difficulty has been experienced in attempting to maintain the caster angle positive due to the fact that this angle varies in dependence upon rocking movement of the steering axle about the steering knuckle pivots and spring perches. It has been found that the deflection of the springs initiated by the steering wheels of the vehicle striking an obstruction or by application of the brakes usually associated with the latter wheels often times effects a rotation of the axle forwardly from its normal position to such an extent as to decrease the caster angle to a negative quantity causing "wandering" of the steering wheels of the vehicle and completely destroying control of the latter. The existence of a negative caster angle is especially dangerous when the spring deflection is caused by the application of the brakes upon the steering wheels since in such an event the angle is maintained negative throughout the entire period of braking, with the result that the operator has practically no control whatsoever over the vehicle during this interval.

It is, therefore, one of the principal objects of the present invention to avoid the numerous objections resulting from the existence of a negative caster angle by providing means for maintaining this angle positive irrespective of spring deflection or rocking movement of the axle.

Another object of the present invention resides in the provision of means of the character set forth above associated with opposite end portions of the axle and fashioned to permit relative deflection of the springs without imparting a twisting force upon the axle.

In accordance with the present invention, the foregoing results are obtained by the provision of mechanism associated with the axle in such a manner as to resist rotation of the same upon deflection of the springs. Resisting rocking movement of the axle permits the realization of another important object in that it minimizes the detrimental effect of brake reaction on the pivotal connection between the steering knuckles and steering gear connecting rod. In other words, by resisting rocking movement of the axle upon deflection of the springs, corresponding rocking movement of the steering knuckles on the ends of the axle is also resisted, with the result that the tendency of the pivotal connection aforesaid between the knuckles and steering gear connecting rod to move forwardly or rearwardly and cause a diving of the steering wheels is materially minimized.

A further feature of the present invention which contributes materially to maintaining the caster angle constant or to minimizing the degree of rocking movement of the axle upon spring deflection resides in the provision of an assembly wherein the springs extend below the axle and wherein the latter is substantially tubular in cross section. By securing the spring to the axle below the latter, the distance between the spring and surface with which the wheels engage is reduced, with the result that the reaction of the brakes is transferred more directly to the frame through the spring, and, as a consequence, rocking of the axle upon application of the brakes is minimized. Moreover, by employing an axle substantially tubular in cross section, the resistance of the same to torsion is appreciably increased, with the result that the tendency for one end of the axle to rock relative to the other and thereby change the caster angle will be materially reduced.

A still further advantageous feature of this invention resides in the provision of means for maintaining the caster angle positive having provision for initially adjusting this angle to the predetermined desired quantity and thereby compensate for any inaccuracies which may occur in manufacture.

The foregoing as well as other objects will be made more apparent as this description proceeds, especially when considered in connection with the accompanying drawings, wherein:

Figure 1 is a side elevational view, partly in section, of a vehicle equipped with the present invention;

Figure 2 is a sectional view taken substantially on the line 2—2 of Figure 1;

Figure 3 is a fragmentary top plan view of one side of the front end construction shown in Figure 1;

Figure 4 is a sectional view taken substantially on the line 4—4 of Figure 2;

Figure 5 is a view similar to Figure 4 showing a slightly modified form of construction.

Referring now to the drawings, it will be noted that there is illustrated in Figure 1 the front end construction of a vehicle comprising a frame 10 having laterally spaced sill members 11 and having a front axle 12 extending transversely of the frame 10 beneath the same. Mounted upon the extreme opposite ends of the axle 12 are the steering wheels A swivelly connected to the axle by means of the steering knuckles B. As is usually the case, each of the knuckles B are pivotally connected to the axle by a king pin C in such a manner that the axes of the pins are inclined to the vertical center line of the steering wheels. The axes of the king pins are designated in Figure 1 by the reference character D, and the angle that the lines D form with the vertical center lines E of the wheels is commonly referred to in the trade as the caster angle.

Extending inwardly from the knuckle B on the steering mechanism side of the vehicle is an arm F having a spherical or ball portion G projecting upwardly from the extremity thereof and fashioned to be received within a socket H fixed to the forward end of a drag link or connecting rod I. The drag link I extends rearwardly from the arm F and is operatively connected to the steering gear J through the medium of an arm K. The aforesaid steering knuckle is provided with an additional rearwardly projecting arm L having the extremity thereof pivotally connected to a corresponding arm on the steering knuckle at the opposite end of the axle through the medium of a connecting link M. The foregoing arrangement is such that manipulation of the steering gear J effects a turning of the wheels A through the medium of the linkage previously set forth.

In accordance with conventional practice, the opposite end portions of the axle 12 are connected to the sills 11 by means of leaf springs 13 extending longitudinally of the frame and suitably connected at opposite ends to the sills. In detail, the front ends of the springs 13 are pivotally connected to adjacent ends of the sills by means of shackles 14, and the rear end of the spring on the steering mechanism side of the vehicle is connected to the sill by means of a suitable anti-shimmy device designated generally by the reference character 15. By connecting the forward ends of the springs to the frame through the medium of shackles in the manner specified above, less geometrical error results since the path of the ball H on the steering arm F will more nearly coincide with the arc formed by the steering gear connecting rod when spring deflection takes place. The anti-shimmy device connecting the rear end of the spring on the steering mechanism side of the vehicle to the sill provides for a slight longitudinal displacement of the spring relative to the frame, and for reasons already familiar to the trade, reduces front wheel shimmy to the minimum.

As shown particularly in Figure 1, the springs 13 extend beneath the front axle 12 and are connected intermediate the ends thereof to the axle. In detail, suitable saddles or perches 16 are seated upon the top leaves of the springs for receiving the lower portions of the axle 12, and the latter together with the saddles are clamped to the springs in the usual manner by means of the U-bolts 17.

It will be observed from the foregoing that application of the brakes associated with the front or steering wheels or contact of the latter with an obstruction in the road will cause the springs 13 to deflect and in so doing effect a rocking movement of the axle forwardly or in the direction of the arrow 24. Rocking movement of the axle from its normal position is extremely objectionable since it not only effects a change in the caster angle, but also imparts a force of considerable magnitude upon the ball H tending to displace the latter in directions longitudinally of the vehicle. Both of the above conditions have a detrimental effect on front end stability and steering control. For example, any tendency for the ball H to move in the above directions is resisted by the drag link I, with the result that this force is transmitted to a turning effort upon the steering knuckles causing a diving of the wheels associated therewith. On the other hand, a change in the caster angle resulting from rocking movement of the axle in the direction of the arrow 24 is especially objectionable since such a condition changes the caster angle to a negative quantity, and, as a consequence, causes wandering of the steering wheels.

In the specific embodiment of the invention illustrated herein, the degree of rocking movement of the axle upon deflection of the springs is appreciably reduced since locating the springs beneath the axle in the manner specified above reduces the distance between the springs and surface with which the associated wheels engage, and, as a consequence, the reaction of the force tending to turn the axle is transmitted more directly to the frame through the springs. Furthermore, any tendency for one end of the axle to twist relative to the other and thereby change the caster angle of the wheel associated therewith as well as affect the steering mechanism is prevented by employing an axle of substantially tubular cross section possessing a relatively high resistance to torsional reactions.

Notwithstanding the foregoing desirable construction, spring deflection caused by either of the above conditions effects a certain amount of rocking movement of the axle in the direction of the arrow 24, or, in other words, reduces the quantity of the caster angle, and since a reduction in caster angle practically renders steering control of the vehicle impossible, it is highly desirable to prevent rocking movement of the axle in the aforesaid direction. In accordance with the present invention, a caster angle of at least the predetermined desired quantity is maintained irrespective of spring deflection, and this is accomplished herein by instituting means in the front end assembly for preventing rocking movement of the axle in the direction of the arrow 24. In general, the aforesaid means comprises triangular devices 25 having the base portions thereof formed by the saddles 16 adjacent opposite ends of the axle 12 and having the apexes connected to the free ends of the shock absorber arms 26 by means of universal joints 27. The arrangement is such that the devices 25 perform the dual function of connecting the shock absorber arms 26 to the axle and of restricting rocking movement of the axle.

Referring now more in detail to the particular construction of the devices 25 and with special reference to Figure 4, it will be noted that each of the saddles 16 are provided with forwardly and rearwardly extending integral lugs 28 and 29, respectively. The rear end of the lug 29 is formed with a laterally extending spherical or ball portion 30 fashioned to engage within a socket 31 formed in the lower end of a link 32. The links 32 extend forwardly and upwardly from their connections with the saddles 16, and in the present instance, are secured at the upper ends thereof to brackets 33 forming the apexes of the devices 25. The forward ends of the lugs 28 on the saddle 16 are provided with laterally outwardly extending studs 34 for pivotally engaging the lower ends of the rods 35. The rods 35 extend upwardly, are inclined rearwardly toward the links 32 and are connected to suitable studs 36 through the medium of flexible cables 37. The opposite ends of the cables 37 are rigidly anchored within the rods 35 and studs 36, and the latter in turn are adjustably secured to the brackets 33 in order to secure the desired caster angle irrespective of slight inaccuracies in manufacture. The desired universal connection between the devices 25 and the shock absorber arms 26 is obtained by forming sockets 38 on the brackets 33 of sufficient dimension to receive cooperating ball portions 39 extending laterally from the shock absorber arms 26.

With the construction as thus far described, it will be apparent that rocking movement of the axle 12 in a direction to decrease the caster angle from its predetermined normal quantity will be prevented by the rigid link connections 32 between the free ends of the shock absorber arms 26 and the saddles 16. In the specific embodiment of the invention, the caster angle actually increases upon deflection of the springs from their normal positions due to the fact that the radius of the arc through which the free ends of the shock absorber arms travel is considerably less than the radius of the arc through which the axle simultaneously travels. If desired, the caster angle may be maintained constant or substantially so during spring deflection by employing a shock absorber arm of a length equivalent to the radius of the arc through which the axle travels during spring deflection, but inasmuch as a positive caster angle is not a serious objection and in view of the fact that a shock absorber arm of the required length to accomplish this result would prove awkward in certain installations, I prefer the construction illustrated herein.

In connection with the foregoing construction, it will also be observed that the links forming the front legs of the triangular devices 25 are flexible, and this is considered an important feature of the present invention, especially when the devices are employed in association with a tubular axle since it permits deflection of the spring on one end of the axle relative to the spring on the other without unduly straining any of the parts. Assuming for the purpose of camparison that the flexible links of the triangular devices are of the rigid type, it will be noted that deflection of one of the springs relative to the other would cause the end of the axle associated with the deflected spring to rock relative to the other end owing to the fact that the latter end would be prevented from corresponding rocking movement. With such an arrangement, relative deflection of the front springs would effect a twist in the front axle, and such a condition is highly objectionable, especially in assemblies employing axles having high torsional resistance such as the tubular type illustrated herein. In accordance with the present invention, the foregoing objection is eliminated since the front links of both the triangular devices 25 possess sufficient flexibility to permit rocking movement of the entire axle in a direction to increase the caster angle even though only one of the springs is deflected.

In Figure 5 of the drawings, I have shown a slightly modified form of triangular device 50 for accomplishing the results previously set forth. The device 50 is similar in construction to the device 25 defined above with the exception that flexibility of the front link is accomplished by rubber bushings instead of by a cable as in the first described form of the invention. In detail, the front link 51 of the device 50 is of integral construction and the lower end thereof extends freely through an opening formed in a lug 52 extending laterally from the spring saddle 53. The aforesaid lower end of the link 51 is yieldably secured to the saddle 53 by means of flexible or rubber washers 54 and 55 disposed upon opposite sides of the lug 52 for engagement therewith. The top washer 54 is clamped in place against the adjacent side of the lug 52 by means of an adjustable nut 56 threaded upon the link 51, while the bottom washer 55 is similarly clamped by a nut 57. The connection aforesaid between the rod and saddle is such as to permit varying the effective length of the rod and thereby provide for adjusting the degree of caster angle. The lower washer 55 is fashioned to possess the minimum amount of flexibility and thereby practically prevents rocking movement of the axle in the direction of the arrow 60, while the upper washer is fashioned to possess a considerably greater degree of flexibility in order to permit the necessary rocking movement of the axle to compensate for deflection of one spring relative to the other.

From the foregoing, it will be apparent that I have materially increased the safety factor of steering mechanisms for vehicles as well as increased the front end stability of the latter by providing means for maintaining a positive caster angle irrespective of spring deflection and by minimizing and tendency for the steering wheels to dive upon deflection of the springs. It will further be observed that I have provided means of the foregoing type having provision for compensating for relative spring deflection without straining the several parts of the front end assembly.

While in describing the present invention the feature of extending the spring below the axle and the provision of an axle of substantially tubular cross section have been defined as cooperating with the means or devices 25 for minimizing rocking of the axle upon spring deflection, nevertheless, it is to be understood that the latter means will also function efficiently when associated in connection with assemblies embodying various arrangements of springs and employing axles of different cross sections. Consequently, reservation is made to make such changes as may come within the purview of the accompanying claims.

What I claim as my invention is:

1. A front end construction for vehicles comprising, a frame, an axle extending transversely of the frame beneath the same, means for suspending the axle from the frame including a spring extending transversely of the axle with one end pivoted to the frame and with a portion spaced longitudinally from the latter end secured to the axle, wheels mounted upon the ends of said axle and having braking means associated therewith, and means associated with said axle substantially preventing rocking movement of the same in a forward direction upon application of the brakes and permitting limited rocking movement of the axle in the opposite direction.

2. A front end construction for vehicles comprising, a frame, an axle extending transversely of the frame beneath the same, means for suspending the axle from the frame including a spring extending beneath the axle and connected to the frame, means for clamping intermediate portions of the spring to the axle, wheels mounted upon said axle, brakes associated with the wheels and axle, and means substantially preventing rocking movement of the axle in the direction of application of the reactive force exerted thereon by the brakes when applied and permitting rocking movement of the axle in the opposite direction upon normal spring deflection.

3. A front end construction for vehicles comprising, a frame, a substantially tubular axle extending transversely of the frame beneath the same, means for suspending the axle from the frame including a spring extending beneath the axle and having the ends thereof connected to the frame, means for clamping intermediate portions of the spring to the axle, wheels mounted upon the ends of the axle, brakes associated with the wheels and axle, and means substantially preventing rocking movement of the axle in the direction of application of the reactive force exerted by the brakes when applied and permitting rocking movement of the axle upon deflection of one end of the latter relative to the other.

4. A front end construction for vehicles comprising, a frame, an axle extending transversely of the frame beneath the same, means for suspending the axle from the frame including a spring connected to the latter and former, means preventing rocking movement of the axle in one direction upon deflection of said spring including a triangular device having one side thereof extending transversely of the axle in fixed relation thereto and having a yieldable front side permitting limited rocking movement of the axle in the opposite direction.

5. A front end construction for vehicles comprising, a frame, an axle extending transversely of the frame beneath the same, means for suspending the axle from the frame including a spring connected to the latter and former, means preventing rocking movement of the axle in one direction upon deflection of said spring including a triangular device having one side thereof extending transversely of the axle in fixed relation thereto and having a yieldable front side permitting limited rocking movement of the axle in the opposite direction, and an arm having one end pivoted to the frame for swinging movement in a vertical plane and having the other end pivoted to the device at the juncture of the front and rear sides.

6. A front end construction for vehicles comprising, a frame, an axle extending transversely of the frame beneath the same, means for suspending the axle from the frame including a spring connected to the latter and former, means preventing rocking movement of the axle in one direction upon deflection of said spring comprising, a rigid link having the lower end pivotally supported upon said axle at one side of the longitudinal axis of the latter and having the upper end pivotally connected to a part carried by the frame and a yieldable connection between the upper end of the link aforesaid and the axle at the opposite side of the longitudinal axis of the latter permitting limited rocking movement of the same in a direction opposite to the one previously set forth.

7. A front end construction for vehicles comprising, a frame, an axle extending transversely of the frame beneath the same, means for suspending the axle from the frame including a spring connected to the latter and former, means preventing rocking movement of the axle in one direction upon deflection of said spring including a triangular device having the base portion extending transversely of the axle in fixed relation thereto and having a flexible front side permitting limited rocking movement of the axle in the opposite direction.

8. A front end construction for vehicles comprising, a frame, an axle extending transversely of the frame beneath the same, means for suspending the axle from the frame including a spring having portions secured to the frame and to the axle, means preventing rocking movement of the axle in one direction upon deflection of the spring including links having the lower ends fixed relative to the axle upon opposite sides of the axis thereof and having the upper ends secured to each other, one of said links having a flexible portion permitting limited rocking movement of the axle in a direction opposite to the one specified above, and means connecting the upper ends of the links to the frame.

9. A front end construction for vehicles comprising, a frame, an axle extending transversely of the frame beneath the same, means for suspending the axle from the frame including a spring having portions secured to the frame and axle, a steering knuckle pivotally connected to one end of the axle with its axis extending substantially vertically with respect to the axis of the axle, means preventing rocking movement of the axle in one direction upon deflection of the spring including links having the lower ends fixed relative to the axle upon opposite sides of the axis thereof and having the upper ends secured together, and means for adjusting the effective length of one of said links to vary the inclination of the steering knuckle axis relative to the vertical.

10. A front end construction for vehicles comprising, a frame, an axle extending transversely of the frame beneath the same, a spring connecting the axle to the frame, means preventing rocking movement of the axle in one direction upon deflection of the spring comprising a rigid link having the lower end supported upon the axle at one side of the longitudinal axis of the latter and having the other end pivotally connected to a spring part of the vehicle, and means connecting the upper end of said link to the axle at the opposite side of the longitudinal axis of the latter permitting limited rocking movement of the axle in a direction opposite to the one previously set forth.

11. A front end construction for vehicles comprising, a frame, an axle extending transversely of the frame beneath the same, a spring connecting the axle to the frame, a steering knuckle pivotally connected to one end of the axle with its axis extending at a predetermined angle with respect to the axis of the axle, means preventing rocking movement of the axle in one direction upon deflection of the spring including a rigid link having the lower end supported upon said axle at one side of the longitudinal axis of the latter, means connecting the upper end of the aforesaid link to the axle at the opposite side of the longitudinal axis of the latter permitting restricted rocking movement of the same in a direction opposite to the one previously set forth, and means for varying the effective length of the latter connection to vary the angular relationship between the axis of the steering knuckle and axle.

12. A front end construction for vehicles comprising, a frame, an axle extending transversely of the frame beneath the same, means for suspending the axle from the frame including a spring connected to the frame and axle, wheels mounted upon opposite end portions of the axle and having brakes associated therewith, means preventing rocking movement of the axle in the direction of application on the latter of the reactive force exerted by the brakes when applied including, a rigid link having the lower end supported upon the axle at one side of the longitudinal axis of the latter, and a connection between the upper end of said link and axle at the opposite side of the longitudinal axis of the latter permitting limited rocking movement of the axle in a direction opposite to the one previously set forth.

EARLE S. MacPHERSON.